United States Patent [19]

Arisawa et al.

[11] 4,031,541

[45] June 21, 1977

[54] COLOR VIDEO DISPLAY SYSTEM

[75] Inventors: Kuniyoshi Arisawa, Higashikurume; Yoshifumi Amano, Zushi, both of Japan

[73] Assignee: Sony Corporation, Tokyo, Japan

[22] Filed: May 7, 1975

[21] Appl. No.: 575,244

[30] Foreign Application Priority Data

May 13, 1974 Japan .................. 49-54090[U]
May 13, 1974 Japan .................. 49-54091[U]

[52] U.S. Cl. ................................................ 358/56
[51] Int. Cl.² ........................................ H04N 9/12
[58] Field of Search ............ 358/56, 59; 178/7.3 D

[56] References Cited

UNITED STATES PATENTS

| | | | |
|---|---|---|---|
| 3,021,387 | 2/1962 | Rajchman | 358/59 X |
| 3,569,614 | 3/1971 | Hanlon | 358/56 |
| 3,595,991 | 7/1971 | Diller | 358/59 |

*Primary Examiner*—Richard Murray
*Assistant Examiner*—Mitchell Saffian
*Attorney, Agent, or Firm*—Lewis H. Eslinger; Alvin Sinderbrand

[57] ABSTRACT

A color video display system employing a flat panel of X-Y matrix type for displaying color pictures thereon and a signal sampling means for sampling input color signals such that sampling phases for different color component signals are sequentially shifted with respect to each other in order to improve the resolution of the reproduced pictures; sampling pulses for neighboring color component signals may be separated by a predetermined interval in order to eliminate or reduce sampling noises from the pictures reproduced on the flat panel.

9 Claims, 9 Drawing Figures

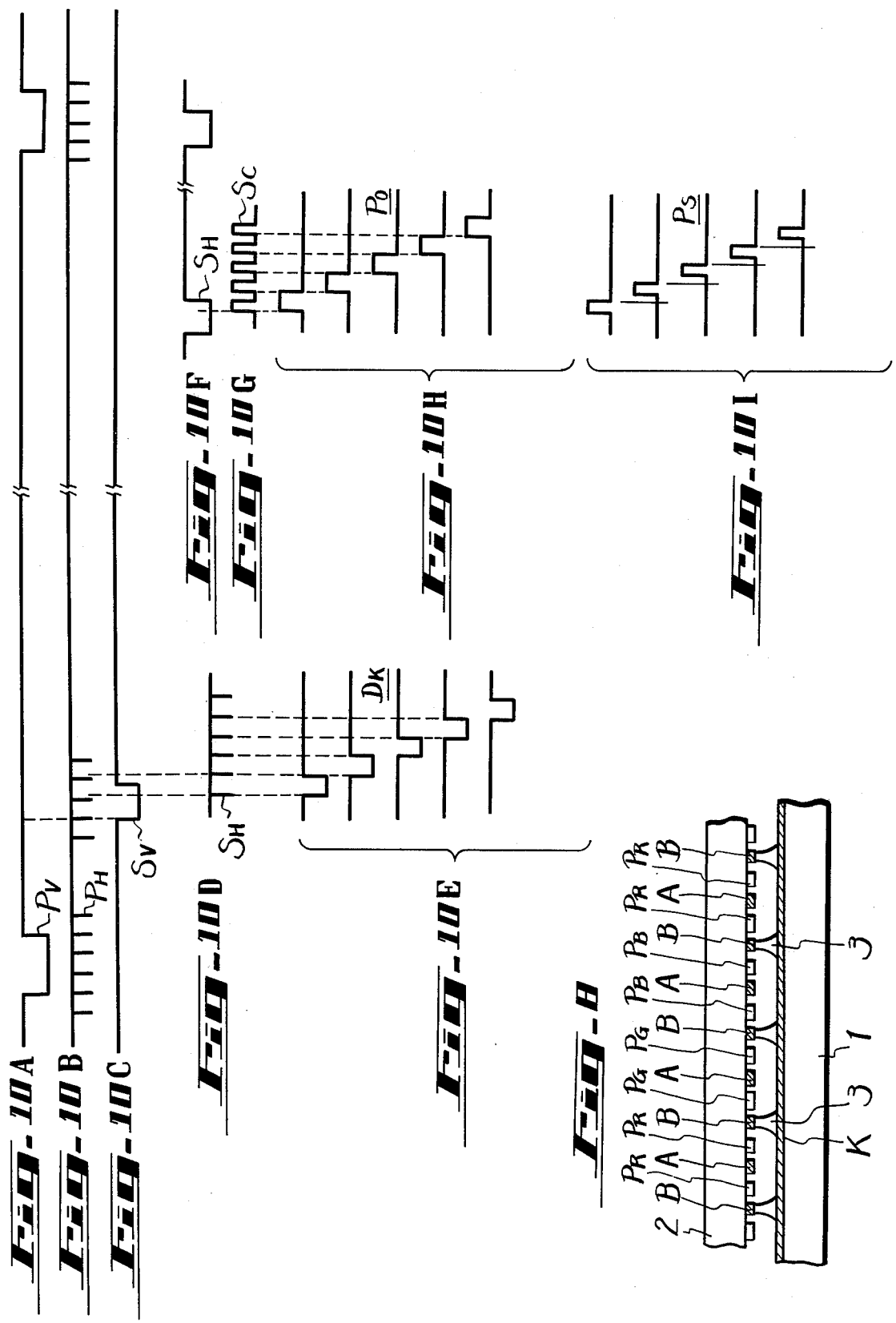

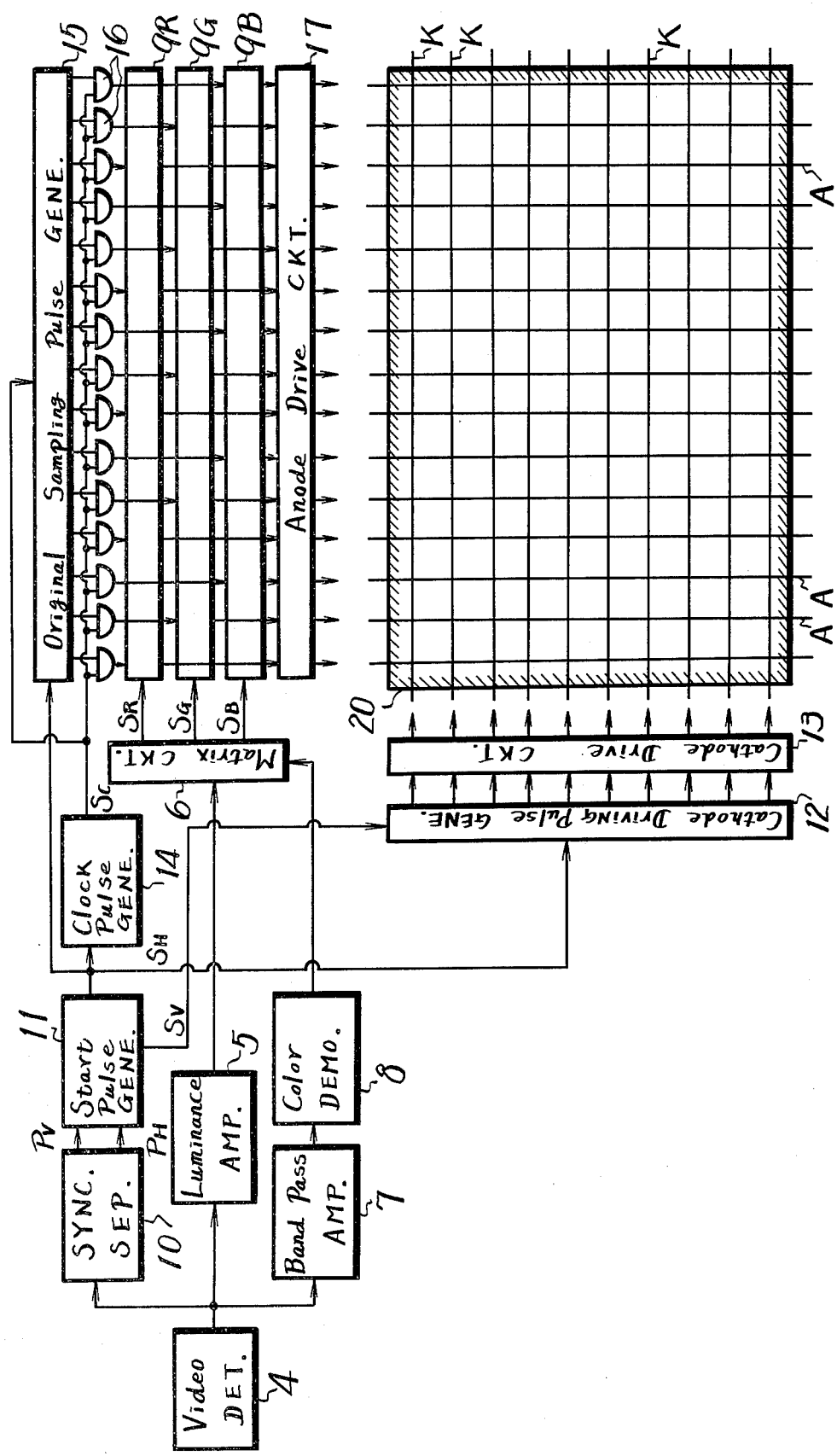

COLOR VIDEO DISPLAY SYSTEM

BACKGROUND OF THE INVENTION

1. Field of the Invention

This invention relates generally to a color video display system and more particularly to such a system which includes a flat panel of X–Y matrix type and an improved signal sampling means for reproducing pictures of good quality on the flat panel.

2. Description of the Prior Art

Recently, video display systems utilizing a flat panel of X–Y matrix type have become the object of considerable interest both for monochrome and color television signal reproducing apparatus.

In such systems, different kinds of flat panels, such as gas discharge panels, liquid crystal panels, electroluminescent panels and the like have been used, and extensive research has been conducted in respect to the flat panels and their driving circuits.

However, the video display systems of the prior art are still unable to reproduce pictures with good quality on flat panels.

It is difficult to reproduce pictures of good resolution on a flat panel, especially color pictures. It is also difficult to reproduce pictures without a noise or flicker, such as a sampling noise.

In systems of the prior art utilizing flat panels to reproduce color pictures having three component colors, the pulse width of each sampling pulse is usually selected to be three times as wide as that used with a monochrome flat panel which is the same size as the color panel and has the same number of row and column lines to be driven. Consequently, the resolution of the color pictures reproduced on the color flat panel necessarily decreases to on-third the resolution of pictures reproduced on the monochrome flat panel.

Furthermore, in the prior art a signal sampling noise is conspicuously visible in the reproduced pictures, since input signals are usually sampled by an uninterrupted train of sampling pulses.

OBJECTS AND SUMMARY OF THE INVENTION

Accordingly, it is an object of this invention to provide an improved color video display system of the type referred to above in which the inherent disadvantages of the prior art are avoided.

It is another object of this invention to provide an improved color video display system having a flat panel of X–Y matrix type in which the resolution of the reproduced color pictures is improved.

It is a further object of this invention to provide an improved video display system in which signal sampling noise is eliminated or much reduced in the reproduced pictures.

In accordance with an aspect of this invention, a signal sampling means for a color video display system having a flat panel of the X–Y matrix type samples input color video signals so that sampling phases for different color component signals are shifted sequentially from one another in order to improve the resolution of color pictures reproduced on the flat panel, and in accordance with another aspect of this invention, sampling pulses for neighboring component color signals are separated by a predetermined interval in order to eliminate or reduce sampling noise from the pictures reproduced on the flat panel.

In a preferred embodiment of the invention, sampling pulses for color component signals are generated by means of a shift register controlled by a clock pulse generator and the output pulse signals from the shift register are used to sample the color component signals sequentially and cyclically, so that sampling phases for different color component signals are sequentially and cyclically shifted from each other.

And further, sampling pulses for the color component signals are preferably introduced through an AND circuit supplied with the output signals of a shift register and a clock pulse generator, so that sampling pulses for neighboring color component signals are separated from each other.

BRIEF DESCRIPTION OF THE DRAWINGS

FIG. 7 is a perspective view, paritally broken away, of a color display panel preferably used in a color video display system according to the present invention.

FIG. 8 is a cross-sectional view of the color display panel shown in FIG. 7.

FIG. 9 is a block diagram of a color video display system according to one embodiment of the present invention.

FIGS. 10A–10I are waveform diagrams for use in explaining the operation of the color video display system shown in FIG. 9.

DESCRIPTION OF THE PREFERRED EMBODIMENT

Such video display systems utilizing an X–Y matrix type video panel are known in which a video signal S (shown in FIG. 1) such as a television signal is sequentially sampled by sampling pulses $P_S$ which are sequentially shifted in phase, so that the sampled values cause sequential light emissions to occur selectively at the intersections of row and column lines so as to display a picture or image corresponding to the video signal.

Figure 2:
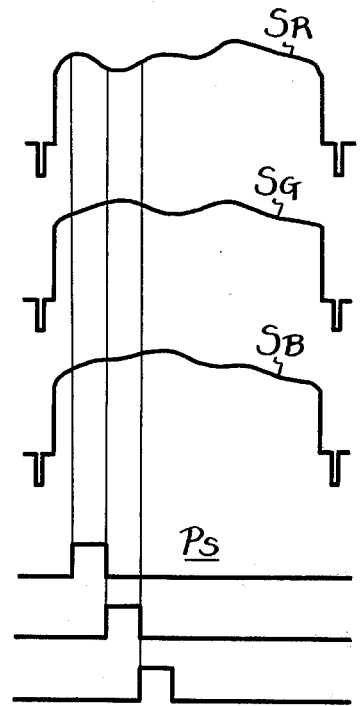

In the case where a color video signal such as a color television signal is displayed on a color video panel of the aforementioned type, such a construction is designed so that every third column line emits light of the same color (red, green or blue) and any three adjacent column lines individually emit a different respective component color. Accordingly, in the case where the number of row and column lines of the color video panel is designed to be the same as in a monochrome video panel, the pulse width of the sampling pulse $P_S$ for the color display, as shown in FIG. 2, lasts three times longer than that of the sampling pulse for the monochrome display. At the same time, a red color component signal $S_R$, a green color component signal $S_G$ and a blue color component signal $S_B$ are simultaneously sampled with the sampling pulse $P_S$, and each succeeding column line is driven with the respective sampled value.

In such a color display apparatus, however, the number of signal samplings for each respective horizontal interval is reduced to one-third that of a monochrome display having the same number of row and column lines, and hence the resolution decreases.

An embodiment of this invention in which the resolution is increased when a color video signal is displayed will be hereinafter described with reference to FIGS. 3 to 10.

Figure 3:
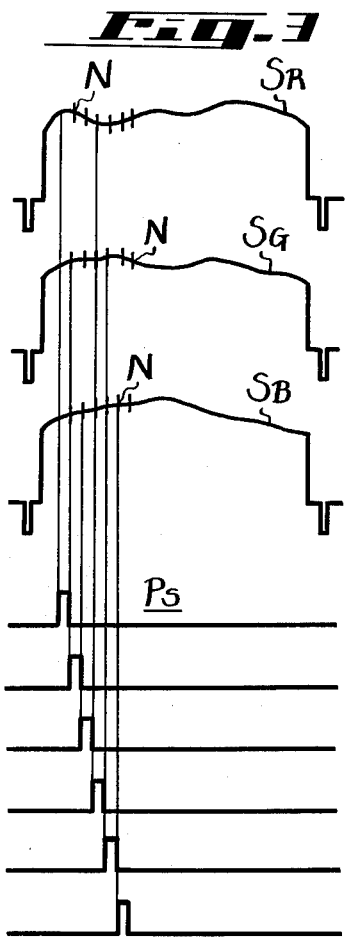

According to one embodiment of this invention, as shown in FIG. 3, the distance between the adjacent sampling pulses $P_S$ is selected to be one-third that of the adjacent sampling pulses shown in FIG. 2, and the red, green and blue color component signals $S_R$, $S_G$ and $S_B$ are sampled with the respective sampling pulses $P_S$ at sequential intervals.

With such a sampling, the amount of color information derived from the video signal becomes three times greater than in the case of the sampling shown in FIG. 2. As a result, when a color picture is displayed on a color video panel which has the same number of row and column lines a monochrome video panel, the same resolution is attainable in both cases.

In one method of sampling the video signal S, as shown in FIG. 3, the trailing edge of one sampling pulse $P_S$ coincides with the rising edge of the next sampling pulse $P_S$ and the respective color component signals $S_R$, $S_G$ $S_B$ are sampled with the sampling pulses $P_S$ at the rising edges thereof, respectively.

With this method, however, a shot pulse is applied to several circuits of the video display system simultaneously with the trailing edges of the respective sampling pulses $P_S$, so that an undesirable noise N, such as a ringing noise, may become superimposed on the respective color component signals $S_R$, $S_G$ and $S_B$. As a result, if the trailing edge of one pulse $P_S$ coincides with the rising edge of the next pulse $P_S$, the noise N is also sampled. Thus, it may occur that a faithfully sampled value cannot be obtained.

It may be preferred to use a sampling pulse train in which a certain interval is provided between the trailing edge of one pulse and the rising edge of the next pulse, in other words any two sampling pulses for two neighboring color component signals are separated from each other by a predetermined interval.

Figure 4:
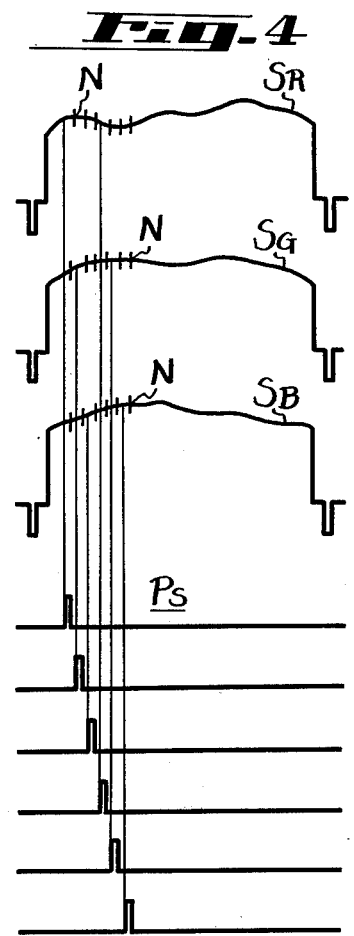
Figure 1:
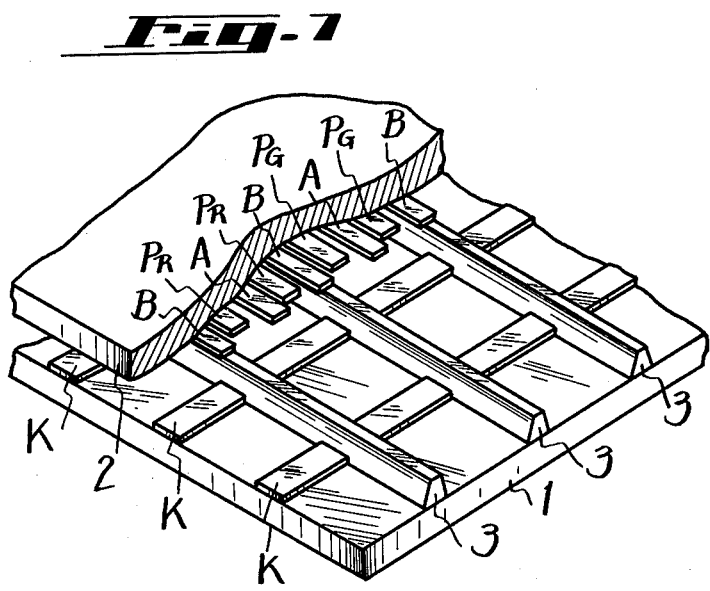

According to one embodiment of the invention, as shown in FIG. 4, pulse $P_S$ shown in FIG. 3, is used. Where a sampling pulse $P_S$ as shown in FIG. 4 is used, the noise N superimposed on the color component signals $S_R$, $S_G$ and $S_B$, respectively, simultaneously with the trailing edges of the respective sampling pulses $P_S$ will not be sampled, and accordingly faithfully sampled values can be obtained. At the time corresponding to the rising edge of the sampling pulse $P_S$ or at the time of signal sampling, the sampling can be carried out even if the sampling pulse $P_S$ does not rise from 0 to 1 completely, but instead rises to a fraction thereof, so that even if the noise N is superimposed on the color component signals $S_R$, $S_G$ and $S_B$ when the sampling pulse $P_S$ rises completely, the noise N is not sampled or is not superimposed on the color component signals $S_R$, $S_G$ and $S_B$.

Figure 5:
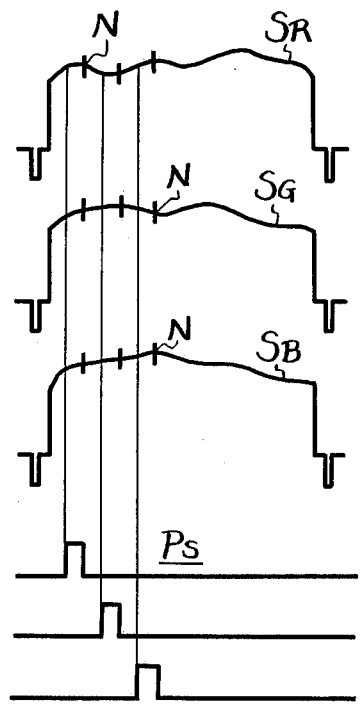

The abovementioned signal sampling system, which does not sample the undesired noise, can be utilized as a color signal sampling system in which a train of pulses $P_S$, each pulse of which is separated from the succeeding pulse by a predetermined period as shown in FIG. 5, is used, and/or as a monochrome signal sampling system.

Figure 1:
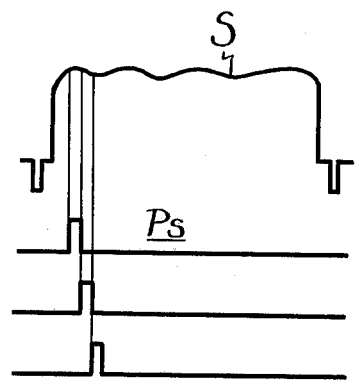
FIGS. 1 – 6 are waveform diagrams for use in explaining the present invention.
Figure 6:
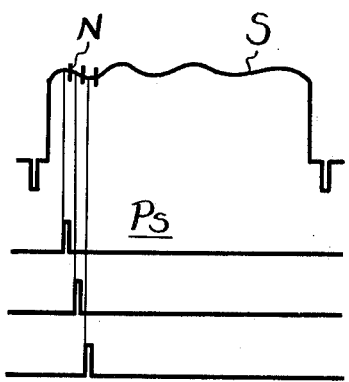

In the latter case, as shown in FIG. 6, a train of pulses $P_S$, whose pulse width corresponds to that of the pulses $P_S$ shown in FIG. 1 and in which any two neighboring pulses are separated by a predetermined interval, is used.

A practical embodiment of the color video display system according to the invention in which signal sampling is carried out as shown in FIG. 4 now will be described with reference to FIGS. 8 to 10.

FIGS. 7 and 8 show one embodiment of the color display panel of the phosphor discharge tube type which is preferred for use in a color video display system according to this invention.

In the color display panel shown in FIGS. 7 and 8, a tube is formed of back and top plates 1 and 2 which are made of an insulating material such as, glass. At least one of the plates 1 and 2 is made transparent or semitransparent. The back and top plates 1 and 2 are arranged in opposed relation and may be sealed with frit glass (not shown) along their marginal edges to form a flat space between them.

On the inner surface of the back plate 1, a group of cathode or common electrodes K in parallel is formed and on the inner surface of the top plate 2, a group of anode or color electrodes A in parrallel with one another and substantially perpendicular to the group of cathode electrodes K is formed. The cathod and anode electrodes K and A correspond to the row and column lines of an X–Y matrix.

A plurality of band insulating ribs 3, each having a predetermined width and arranged in parallel with each other at a predetermined angle to the column direction or intersecting each of the cathode electrodes K at substantially right angles, are formed on the inner surface of the back plate 1. These band insulating ribs 3 may be made by printing glass in a predetermined pattern on the inner surface of the back plate 1 or by coating the entire inner surface of the back plate 1 with glass and etching away unnecessary portions thereof in the predetermined pattern.

A plurality of barrier electrodes B are formed on the inner surface of the top plate 2 in corresponding position with the parallel insulating ribs 3 respectively, and extending therewith.

The anode electrodes A and the barrier electrodes B may be formed of a transparent and conductive material such as Nesa (trademark).

Thus, discharge cells are formed at the respective intersections of cathode electrodes K and anode electrodes A.

Phosphors $P_R$, $P_G$ and $P_B$, which may emit predetermined color component lights such as red, green and blue, are provided in the discharge cells, respectively. For example, as shown in FIG. 7, the red phosphor $P_R$ is printed or deposited on the inner surface of the top plate 2 in patterns extending in parallel with both sides of every fourth electrode of the anode electrode goup A; the green phosphor $P_G$ is printed or deposited on the inner surface of the top plate 3 in patterns extending in parallel with both sides of every fourth electrode of the anode electrode group A next to the red phosphor $P_R$; and the blue phosphor $P_B$ is printed or deposited on the inner surface of the top plate 3 in patterns extending in parallel with both sides of every fourth electrode of the anode electrode group A next to the green phosphor $R_G$.

The anode electrodes A perform as color or color selection electrodes arranged so that the three different component color electrodes are aligned sequentially and electrodes of the same color occur every fourth electrode.

The back plate 1 and the top plate 2 are assembled in opposing relationships so that the parallel insulating ribs 3 formed on the inner surface of the back plate 1 are in contact with the corresponding parallel barrier electrodes B formed on the inner surface of the top plate 2. The distance between the opposed surfaces of the back and top plates 1 and 2 is determined substantially by the height of the insulating ribs B. Then the corresponding marginal edges of plates 1 and 2 are sealed by the frit glass (not shown) as described above.

The cathode electrodes K perform as common electrodes supplied with on and off voltages in time division manner, and the anode or color electrodes A are supplied with voltages modualted by input color signals, as will be explained in detail hereinafter.

Thus, discharges are caused at the intersections of the anode electrodes A and the cathode electrodes K to which the on voltages are supplied to excite the phosphors $P_R$, $P_G$ and $P_B$ in the discharge cells which then emit red, green and blue color lights, respectively. In ths case, the luminances of the lights emitted from the phosphors respond to the voltage differences between the anode electrodes A and the cathode electrodes K which correspond to the display signals to produce a color picture by combining the color lights emitted from the respective phosphors which are excited in a dot-or line-sequence manner. The produced picture can be viewed through the top plate 2.

The respective barrier electrodes B are supplied from a DC voltage source (not shown) with a constant DC voltage which is approximately one-half the discharge voltage. The cathode glow is confined by the insulating ribs 3. The ions and electrons produced by the glow are repelled and annihilated by the barrier electrodes B and are lost in electric charges at the ribs or on the inner surface of the plates in the vicinity thereof. Thus, any cross talk is avoided. The color display panel as shown in FIGS. 7 and 8 is known in the prior art, so that further detailed explanation thereof will be omitted for the sake of brevity.

Now, an embodiment of the color video display system according to this invention will be described with reference to FIG. 9 together with FIGS. 10A to 10I showing waveform diagrams.

With the invention shown in FIG. 9, the detected video signal from a video detector 4 is supplied to a luminance amplifier 5 which then produces a luminance signal and supplies the same to a matrix circuit 6. The detected video signal from the video detector 4 is supplied further to a band pass filter 7 which produces a chrominance signal and supplies the same to a color demodulator circuit 8. The color demodulator circuit 8 produces two color difference signals which then are applied to the matrix circuit 6. The matrix circuit 6 produces red, green and blue color video signals $S_R$, $S_G$ and $S_B$, respectively, which are then fed to sampling and memory circuits 9R, 9G and 9B, respectively.

The video signal from the video detector 4 is also supplied to a sync. separator circuit 10 which then produces a vertical synchronizing pulse $P_V$ and a horizontal synchronizing pulse $P_H$ (refer to FIGS. 10A and 10B) and supplies the same to a start pulse generator circuit 11. This start pulse generator circuit 11 then produces a vertical start pulse $S_V$ and a horizontal start pulse $S_H$ (refer to FIGS. 10C and 10D) and supplies the same to a row line or cathode driving pulse generator circuit 12 preferably formed of a shift register which then produces pulses at its respective output terminals which are shifted sequentially by one horizontal period. These pulses form the pulse generator circuit 12 are fed to a cathode drive circuit 13 which produces at its respective output terminals driving pulses $D_K$ which are sequentially shifted by one horizontal period and have the pulse width of one horizontal period (refer to FIG. 10E). These pulses $D_K$ are fed to the corresponding row line electrodes or cathode electrodes K of a display panel 20 constructed as described above.

The horizontal start pulse $S_H$ (refer to FIG. 10F) from the start pulse generator circuit 11 is also fed to a clock pulse generator circuit 14 which then produces a clock pulse $S_C$ (refer to FIG. 10G). The pulses $S_H$ and $S_C$ are fed to an original sampling pulse generator circuit 15 formed of a shift register which then produces at its respective output terminals original sampling pulses $P_O$ (refer to FIG. 10H) the same in number as the anode electrodes. Pulses $P_O$ are sequentially shifted by a predetermained time sufficiently shorter than one horizontal period and have the pulse width of the shifted time. The original sampling pulses $P_O$ and the clock pulses $S_C$ from the clock pulse generator circuit 14 are fed to AND-gate circuits 16 which are provided in correspondence with the respective anode electrodes A, respectively. The AND-gate circuits 16 produce sampling pulses $P_S$ (refer to FIG. 10I) whose pulse width is one-half of that of the original sampling pulse $P_O$ and hence there is a predetermined distance between the trailing edge of one pulse and the rising edge of the following pulse.

The sampling pulses $P_S$ corresponding to the respective colors are fed to the sampling and memory circuits 9R, 9G and 9B corresponding to the respective colors. Thus, the respective color video signals $S_R$, $S_G$ and $S_B$ are sampled as shown in FIG. 4, and the sampled values are held for one horizontal period. The output signals from the respective sampling and memory circuits 9R, 9G and 9B are supplied to an anode drive circuit 17 whose output signals are supplied to anode electrodes or color electrodes A corresponding to the respective colors sequentially and cyclically.

Thus, a color video signal can be reproduced on the display panel 20 as a color picture.

In the above embodiment, the sampling and memory circuits 9R, 9G and 9B are driven directly with analog signals, but a similar effect can be obtained when they are driven with digital signals. In the latter case, it is enough that the respective color video signals $S_R$, $S_G$ and $S_B$ from the matrix circuit 6 are supplied to the sampling and memory circuits 9R, 9G and 9B through an analog to digital converter and pulse-code converter.

In the invention described as above, the sampling positions are shifted at the respective color video signals, so that a color picture can be reproduced with good resoltuion.

And further, sequential sampling pulses for neighboring color component signals are separated from each other by a predetermined interval, and any sampling noise does not appear in the color pictures reproduced on the flat panel.

The above described video display system of the invention has employed a flat panel in which discharge light emission is used, but it will be apparent that a video display system of the present invention can be applied to flat display panels in which light emission is achieved by liquid crystals, electroluminescence and the like.

Although an illustraive embodiment of this invention has been described in detail herein with reference to the accompanying drawings, it is to be understood that the invention is not limited to that precise embodiment, and that various changes and modifications may be effected therein by one skilled in the art without departing from the scope of spirit of the invention as defined in the appended claims.

We claim as our invention:

1. A color video display system comprising: a color display panel having a plurality of component color generating means arranged in rows and in columns substantially perpendicular to said rows and arranged to generate a repeating pattern of component colors along selected ones of said rows in a predetermined sequence; means responsive to an input video signal for generating a plurality of component color signals and a synchronizing signal; signal sampling means responsive to said synchonizing signal for sampling said component color signals so that different component color signals are sampled sequentially; means applying the sampled component signals to respective ones of said component color generating means for generating said repeating pattern of component colors along selected ones of said rows; and row selecting means responsive to said synchronizing signal to energize said rows in said predetermined sequence, whereby color pictures are reproduced on said color display panel.

2. A color video display system according to claim 1, wherein said signal sampling means includes a plurality of sampling circuits operative to receive respective ones of said component color signals and to sample said respective component color signals according to a repeating time sequence such that said component color signals are sampled at different respective time periods.

3. A color video display system according to claim 2, wherein said signal sampling means further comprises means responsive to said synchronizing signal for generating sequential signal sampling pulses at a predetermined rate and providing selected ones of said signal sampling pulses to said respective sampling circuits such that said component color signals are sampled according to said repeating time sequence and at said predetermined rate.

4. A color video display system according to claim 3, wherein said means for generating sequential signal sampling pulses comprises: A clock pulse generator responsive to said synchronizing signal to generate clock pulses having the same repetition rate as said predetermined rate for generating said signal sampling pulses; and a shift register having a plurality of output terminals and an input terminal receiving said clock pulses, and operative to generate said sequential signal sampling pulses at successive ones of said plurality of output terminals.

5. A color video display system according to claim 3, wherein said means for generating sequential signal sampling pulses is operative to generate said pulses such that successive signal sampling pulses are separated by a predetermined interval.

6. A color video display system according to claim 5, wherein said means for generating sequential signal sampling pulses comprises: A clock pulse generator responsive to said synchronizing signal to generate clock pulses having a repetition rate the same as said predetermined rate, such that sequential clock pulses are separated by said predetermined interval; a sampling pulse generator having a first input terminal for receiving said clock pulses, a second input terminal for receiving said synchronizing signal, and a plurality of output terminals at which a sampling pulse having the same repetition rate as said clock pulses is provided in succession; and a plurality of gating means each having a first gating input connected to a respective one of said output terminals of said sampling pulse generator to there receive said sampling pulse, a second gating input receiving said clock pulses, each of said gating means being operative to provide at a gating output a respective sequential signal sampling pulse when said sampling pulse and said clock pulse are both received at respective gating inputs.

7. A color video display system according to claim 6, wherein each said gating means comprises an AND gate.

8. A color video display system according to claim 1, wherein said row selecting means comprises: a shift register receiving said synchronizing signal and having a plurality of output terminals each corresponding to a respective one of said rows of said component color generating means, said shift register being responsive to said synchronizing signal to generate row energizing signals at respective ones of said plurality of output terminals for energizing said rows of said component color generating means in said predetermined sequence.

9. A color video display system according to claim 8, wherein said display panel has a group of parallel column electrodes and a group of parallel row electrodes substantially perpendicular to said group of parallel column electrodes, wherein said component color generating means are located at the overlapping areas of said groups of said parallel column and row electrodes, said row electrodes receiving said row energizing signals generated at respective ones of said plurality of output terminals of said shift register such that said rows of component color generating means are energized in said predetermined sequence, said column electrodes receiving said sampled color component signals for generating said repeating pattern of component colors.

* * * * *